No. 751,182. Patented February 2, 1904.

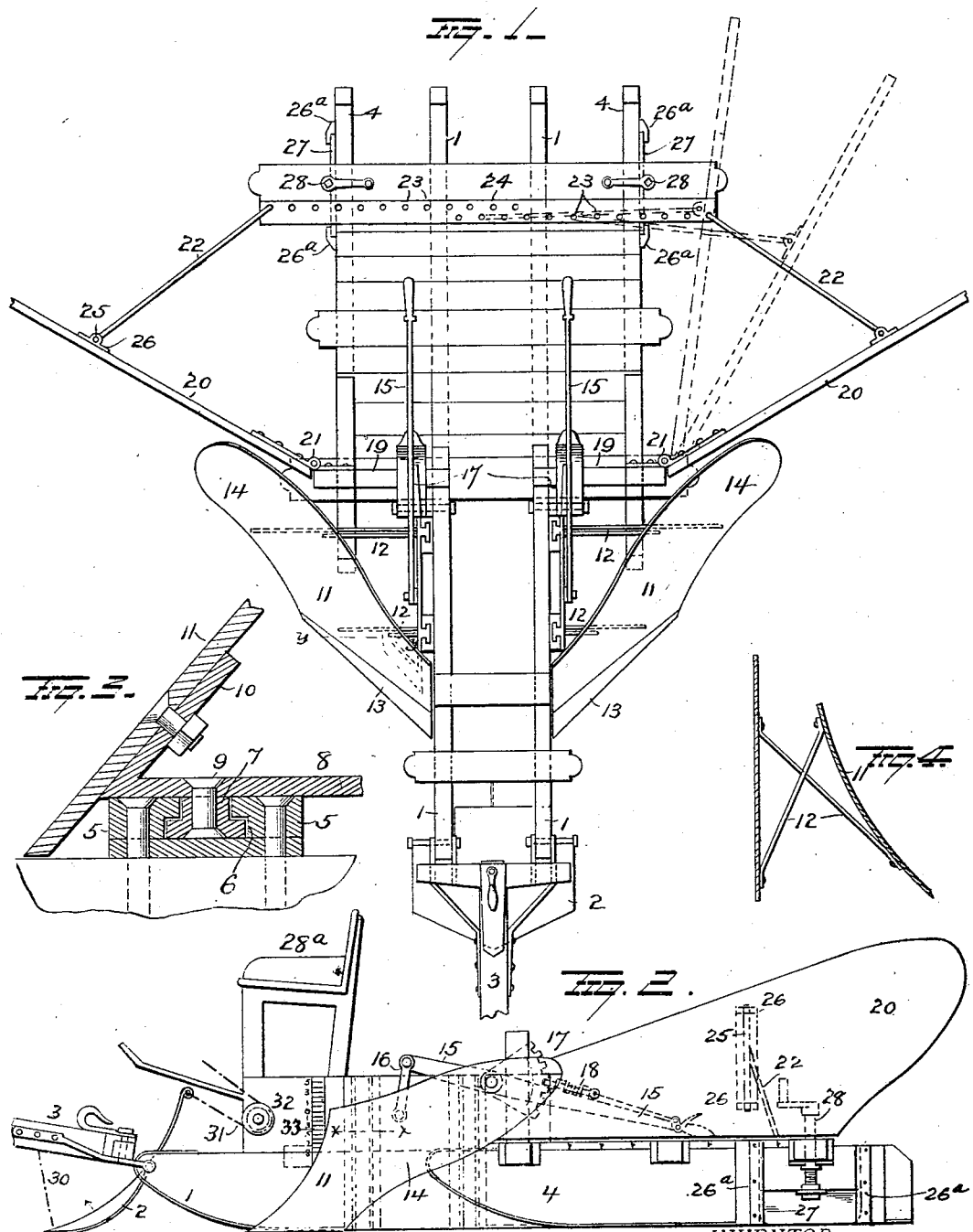

UNITED STATES PATENT OFFICE.

STEPHEN D. LAMOS, OF LONGLAKE, NEW YORK.

SNOW-PLOW.

SPECIFICATION forming part of Letters Patent No. 751,182, dated February 2, 1904.

Application filed March 10, 1903. Serial No. 147,141. (No model.)

*To all whom it may concern:*

Be it known that I, STEPHEN D. LAMOS, a resident of Longlake, in the county of Hamilton and State of New York, have invented certain new and useful Improvements in Snow-Plows; and I do hereby declare the following to be a full, clear, and exact description of the invention, such as will enable others skilled in the art to which it appertains to make and use the same.

My invention relates to an improvement in snow-plows, and more particularly to plows of the character mounted upon a sled and adapted for cleaning roads, streets, and the like, the object of the invention being to provide an improved plow and adjustable mounting therefor and improved adjustable wings for throwing the snow as far to one side as may be desired.

A further object is to construct a sled with improved plows at both sides and provide improved coöperating mechanism for insuring the perfect operation thereof.

With these objects in view the invention consists in certain novel features of construction and combinations and arrangements of parts, as will be more fully hereinafter described, and pointed out in the claims.

In the accompanying drawings, Figure 1 is a plan view illustrating my improvements. Fig. 2 is a view in side elevation. Fig. 3 is a horizontal sectional view on the line $x\,x$ of Fig. 1, and Fig. 4 is a view in vertical section on the line $y\,y$ of Fig. 1.

1 1 represent long parallel runners having a plow or scraper 2 at their forward ends to turn the snow to both sides, and suitable thills connect these runners 1 with the tongue 3. Shorter runners 4 are located at the outer sides of runners 1, and all of said runners are preferably spaced an equal distance apart and connected by cross timbers or slats.

To the outer faces of runners 1 1, near their forward ends, timbers or bars 5 are secured, forming dovetailed vertical grooves 6, in which dovetailed bars 7 are mounted to slide, and plates 8 are secured by rivets 9 or otherwise to these bars 7. The plates 8 are provided at their forward edges with rearwardly-projecting inclined extensions 10, to which the plows 11 are securely fastened by bolts or rivets, and diagonal braces 12 connect the plates 8 and plows 11 at intermediate points to securely hold the latter in operative position. Each plow 11 is of the general shape shown, having a cutting edge 13 and moldboard 14, and levers 15 are pivotally supported between their ends on the runner-frame and connected by links 16 with plates 8, so that by raising and lowering the free ends of said levers the plows can be raised or lowered at will. A toothed segment 17 is secured to the frame, and a spring-pressed detent 18 is provided on each lever to lock the same and plow in any position of adjustment.

To the respective ends of a cross-timber 19 deflecting-wings 20 are connected by hinges 21 at one end, which are located behind the rear end of plows 11, and rods 22 are connected at one end to the inner faces of wings 20 and have hooks at their other ends to enter any of a series of openings 23 in a cross-bar 24 at the rear of the sled, and thereby secure the wings at any angle desired. The rods 22 are connected to vertical rods 25, having bearings 26 secured to the inner face of wings 20 to provide an elongated bearing for the brace-rods 22 and permit of pivotal movement thereof.

To the outer faces of the outer runners 4, near their rear ends, vertical guides $26^a$ are secured and in which plates 27 are mounted to slide and are raised and lowered by means of set-screws 28. These plates 27 serve as guides and when depressed insure the true running of the sled, preventing sluing to one side due to excessive pressure of snow on one plow and wing.

A driver's seat $28^a$ and foot-rest 29 are provided for convenience, and the middle scraper 2 is pivotally supported between its ends and has a chain 30 connecting its lower end with the tongue 3 to hold the scraper in operative position. Another chain 31 is connected to the upper end of the scraper and passed around a pulley 32 on the sled-frame and adapted to draw the scraper to a horizontal position when it is desired to leave a path of snow between the runners.

On the sides of runners 1 scales 33 are located to indicate the depth of the plows. For instance, when the point or pointer of the plow points to "0" the plow is just flush with the bottom of the runners, and the distance it is above or below the bottom of the runners is indicated in inches by the scale.

In operation the scraper 2 turns the snow to both sides, when it is taken up by the plows 11 and passed onto wings 20, which throw it to the sides, the distance of the throw being regulated by the position of the wings.

When the plow is to be moved from place to place, the levers 15 are forced down to raise plows 11 out of contact with the ground and the front scraper 2 is turned to a horizontal position.

Slight changes might be made without departing from my invention, and hence I consider myself at liberty to make such slight changes and alterations as fairly fall within the spirit and scope of my invention.

Having fully described my invention, what I claim as new, and desire to secure by Letters Patent, is—

1. In a snow-plow, the combination with a sled, of a plow at one side of the sled and supported to move vertically thereon, and a lever to adjust the plow vertically.

2. In a snow-plow, the combination with a sled having longitudinal runners, and plows on opposite sides thereof, of guides on the runners, vertically-movable guide-plates in said guides, and means for forcing said plates below the runners to securely hold the sled against sluing to one side.

3. In a snow-plow, the combination with a sled comprising longitudinal runners, of a scraper between the forward ends of the runners to deflect the snow to both sides, means for swinging said scraper to an inoperative position, plows on the opposite sides of the sled, wings behind the plows, and means for securing the wings at any angle.

4. In a snow-plow, the combination with a sled having dovetailed grooves in its side, of a plow, a plate secured to the inner face of the plow, dovetailed bars secured to the plate and mounted in the dovetailed grooves, and means for moving the plow and locking it in any position.

5. In a snow-plow, the combination with a sled, comprising four longitudinal runners connected by cross-bars, vertically-adjustable plows on the outside of the two central runners and adapted to extend below the runners, vertically-adjustable plates on the outer runners to guide the sled in a straight line, and hinged wings behind the plows to deflect the snow to the sides.

In testimony whereof I have signed this specification in the presence of two subscribing witnesses.

STEPHEN D. LAMOS.

Witnesses:
  JOHN ANDERSON, Jr.,
  PATRICK J. TUMMINS.